US011343199B2

(12) United States Patent
Kobayashi et al.

(10) Patent No.: US 11,343,199 B2
(45) Date of Patent: May 24, 2022

(54) RESOURCE RESERVATION MANAGEMENT DEVICE AND RESOURCE RESERVATION MANAGEMENT METHOD

(71) Applicant: Nippon Telegraph and Telephone Corporation, Tokyo (JP)

(72) Inventors: Hiroaki Kobayashi, Musashino (JP); Naoki Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/058,745

(22) PCT Filed: May 24, 2019

(86) PCT No.: PCT/JP2019/020583
§ 371 (c)(1),
(2) Date: Nov. 25, 2020

(87) PCT Pub. No.: WO2019/230577
PCT Pub. Date: Dec. 5, 2019

(65) Prior Publication Data
US 2021/0377183 A1  Dec. 2, 2021

(30) Foreign Application Priority Data
Jun. 1, 2018 (JP) .............................. JP2018-105868

(51) Int. Cl.
*H04L 12/911* (2013.01)
*H04L 47/722* (2022.01)
(Continued)

(52) U.S. Cl.
CPC ........... *H04L 47/722* (2013.01); *G06Q 10/02* (2013.01); *G06Q 10/06* (2013.01); *H04L 47/821* (2013.01); *H04L 47/827* (2013.01); *H04L 47/828* (2013.01)

(58) Field of Classification Search
CPC ........ G06Q 10/02; G06Q 10/06; G06Q 10/00; G06Q 10/10; H04L 47/722; H04L 47/821;
(Continued)

(56) References Cited

U.S. PATENT DOCUMENTS

2004/0193674 A1   9/2004  Kurosawa et al.
2009/0043809 A1*  2/2009  Fakhouri ................ G06Q 10/06
(Continued)

FOREIGN PATENT DOCUMENTS

JP    2004-302918   10/2004
JP    2005-234637    9/2005
(Continued)

OTHER PUBLICATIONS

Aws.amazon.com, [online], "Amazon EC2 Reserved Instance," 2018, retrieved on Apr. 6, 2018, retrieved from URL<https://aws.amazon.com/jp/ec2/pricing/reserved-instances/?>. 17 pages (with English Translation).
(Continued)

*Primary Examiner* — Le H Luu
(74) *Attorney, Agent, or Firm* — Fish & Richardson P.C.

(57) ABSTRACT

[Problem] When a resource reserved in a resource sharing system become unavailable, the reservation is efficiently reset.
[Solution] A resource sharing system 10 shares resources 30 with a plurality of users 20 (user terminals). A resource reservation management device 42 includes: a reservation setting unit 402 that accepts a reservation request for the resource 30 from the user 20, and sets a reservation on a predetermined resource 30 in the resource sharing system 10; and a reservation changing unit 404 that resets the reservation to another resource 30 in the resource sharing system 10 in case the predetermined reserved resource 30
(Continued)

becomes unavailable. if the other resource 30 has insufficient resource capacity, the reservation changing unit 404 resets the reservation to the other resource 30 based on a reservation changing policy defining which reservation is preferentially reset out of the reservation to be reset.

14 Claims, 10 Drawing Sheets

(51) Int. Cl.
*H04L 47/70* (2022.01)
*G06Q 10/02* (2012.01)
*G06Q 10/06* (2012.01)

(58) Field of Classification Search
CPC . H04L 47/827; H04L 47/828; H04L 41/0896; H04L 47/745; H04L 61/1511; H04L 63/06; H04L 67/1046; G06F 9/5027; G06F 9/5061; G06F 9/5072
See application file for complete search history.

(56) References Cited

U.S. PATENT DOCUMENTS

| | | | |
|---|---|---|---|
| 2012/0179824 A1* | 7/2012 | Jackson | G06F 9/5072 709/226 |
| 2014/0089994 A1 | 3/2014 | Fujisawa et al. | |
| 2015/0039357 A1* | 2/2015 | Segal | G06Q 10/10 705/5 |
| 2015/0363240 A1 | 12/2015 | Koizumi | |
| 2017/0026309 A1* | 1/2017 | Vicaire | G06F 9/5061 |
| 2017/0083432 A1 | 3/2017 | Dhulipala | |
| 2017/0134485 A1* | 5/2017 | Kim | H04L 67/1046 |
| 2017/0149931 A1* | 5/2017 | Lochhead | H04L 41/0896 |
| 2017/0318022 A1* | 11/2017 | Perez | H04L 63/06 |
| 2018/0039525 A1* | 2/2018 | Boss | H04L 47/745 |
| 2018/0157532 A1* | 6/2018 | Kumar | G06F 9/5027 |
| 2018/0159986 A1* | 6/2018 | Yasrebi | H04L 61/1511 |
| 2020/0319925 A1* | 10/2020 | Clampitt, III | G06Q 10/00 |

FOREIGN PATENT DOCUMENTS

| | | |
|---|---|---|
| JP | 2010-028195 | 2/2010 |
| JP | 2016-110448 | 6/2016 |
| JP | 2017-033117 | 2/2017 |
| WO | WO 2012/157754 | 11/2012 |
| WO | WO 2014/119719 | 8/2014 |

OTHER PUBLICATIONS

Docs.openstack.org, [online], "Blazar, the OpenStack Reservation Service," Mar. 29, 2018, retrieved on Apr. 6, 2018, retrieved from URL<https://docs.openstack.org/blazar/latest/>, 4 pages.
Song et al., "Adaptive Resource Provisioning for the Cloud Using Online Bin Packing," IEEE Transactions on Computers, Nov. 2014, 63(11):2647-2660.

* cited by examiner

| RESERVATION IDENTIFIER | DATE AND TIME FOR USE | USAGE PERIOD | AVAILABLE RESOURCE |
|---|---|---|---|
| PROJECT A | 2018/02/10/0:00 to 2018/02/12/23:59 | 72 HOURS | (4 CORE, 8 GB RAM, 100 GB DISK) x 4 |

| RESERVATION 1 | 2018/03/12 ~ 2018/03/27 | 16 DAYS | (2 CORE, 4 GB RAM, 10 GB DISK) x3 | PRIORITY: 10 |
| --- | --- | --- | --- | --- |
| RESERVATION 3 | 2018/02/10 ~ 2018/02/15 | 6 DAYS | (4 CORE, 8 GB RAM, 100 GB DISK) x4 | PRIORITY: 8 |
| RESERVATION 4 | 2018/04/02 ~ 2018/04/30 | 29 DAYS | (1 CORE, 2 GB RAM, 5 GB DISK) x1 | PRIORITY: 5 |
| RESERVATION 2 | 2018/04/01 ~ 2018/04/03 | 3 DAYS | (8 CORE, 16 GB RAM, 100 GB disk) x4 | PRIORITY: 1 |

RESETTING ORDER →

PRIORITY IN DECREASING ORDER

Fig. 7

| RESETTING ORDER → | | START DATE INCREASING ORDER | | |
|---|---|---|---|---|
| RESERVATION 3 | 2018/02/10 ~ 2018/02/15 | 6 DAYS | (4 CORE, 8 GB RAM, 100 GB DISK) x 4 |
| RESERVATION 1 | 2018/03/12 ~ 2018/03/27 | 16 DAYS | (2 CORE, 4 GB RAM, 10 GB DISK) x 3 |
| RESERVATION 2 | 2018/04/01 ~ 2018/04/03 | 3 DAYS | (8 CORE, 16 GB RAM, 100 GB disk) x 4 |
| RESERVATION 4 | 2018/04/02 ~ 2018/04/30 | 29 DAYS | (1 CORE, 2 GB RAM, 5 GB DISK) x 1 |

Fig. 8

| RESERVATION 4 | 2018/04/02 ~ 2018/04/30 | 29 DAYS | (1 CORE, 2 GB RAM, 5 GB DISK) x 1 |
| RESERVATION 1 | 2018/03/12 ~ 2018/03/27 | 16 DAYS | (2 CORE, 4 GB RAM, 10 GB DISK) x 3 |
| RESERVATION 3 | 2018/02/10 ~ 2018/02/15 | 6 DAYS | (4 CORE, 8 GB RAM, 100 GB DISK) x 4 |
| RESERVATION 2 | 2018/04/01 ~ 2018/04/03 | 3 DAYS | (8 CORE, 16 GB RAM, 100 GB disk) x 4 |

RESETTING ORDER →

RESOURCE CAPACITY INCREASING ORDER

Fig. 9

| | | |
|---|---|---|
| RESERVATION 2 | 2018/04/01 ~ 2018/04/03 | 3 DAYS | (8 CORE, 16 GB RAM, 100 GB disk) x 4 |
| RESERVATION 3 | 2018/02/10 ~ 2018/02/15 | 6 DAYS | (4 CORE, 8 GB RAM, 100 GB DISK) x 4 |
| RESERVATION 1 | 2018/03/12 ~ 2018/03/27 | 16 DAYS | (2 CORE, 4 GB RAM, 10 GB DISK) x 3 |
| RESERVATION 4 | 2018/04/02 ~ 2018/04/30 | 29 DAYS | (1 CORE, 2 GB RAM, 5 GB DISK) x 1 |

RESETTING ORDER →

USAGE PERIOD INCREASING ORDER

Fig. 10

RESOURCE RESERVATION MANAGEMENT DEVICE AND RESOURCE RESERVATION MANAGEMENT METHOD

CROSS-REFERENCE TO RELATED APPLICATIONS

This application is a National Stage application under 35 U.S.C. § 371 of International Application No. PCT/JP2019/020583, having an International Filing Date of May 24, 2019, which claims priority to Japanese Application Serial No. 2018-105868, filed on Jun. 1, 2018. The disclosure of the prior application is considered part of the disclosure of this application, and is incorporated in its entirety into this application.

TECHNICAL FIELD

The present invention relates to a resource reservation management device and a resource reservation management method in a resource sharing system that share resources with multiple users.

BACKGROUND ART

In cloud services such as Infrastructure as a Service (IaaS), a model in which multiple users (services, applications, etc.) share resources (computer, network, storage, etc.) and each user utilizes the resources as necessary has been widespread.

On the other hand, because the shared resources are finite, it has been proposed to reserve resources such that the user can reliably use the resources (for example, see NPL1 and NPL2). In particular, in small private cloud services where resources are limited, the importance of reservation is larger.

CITATION LIST

Non Patent Literature

NPL1: "Blazar, the Open Stack Reservation Service" [online], [Searched on May 14, 2018], Internet: https://docs.openstack.org/blazar/latest/>
NPL2: "Amazon EC2 Reserved instance" [online], [Searched on May 14, 2018], Internet: https://aws.amazon.com/jp/ec2/pricing/reserved-instances/>
NPL3: Weijia Song, et. al, "Adaptive Resource Provisioning for the Cloud Using Online Bin Packing", IEEE Transactions on Computers, Volume: 63, Issue: 11, November 2014

SUMMARY OF THE INVENTION

Technical Problem

In the resource sharing system as described above, when a reserved resource fails, the reservation may be transferred to another available resource (alternative resource), thereby eliminating or reducing an impact on the user.
However, when available resources lack in the system, there is a problem that some reservations are not achieved (a situation where the reserved resources cannot be used).
The present invention is devised in view of such circumstances, and an object of the present invention is to efficiently transfer the reservation when resources reserved in a resource sharing system are not available.

Means for Solving the Problem

To achieve the above objectives, the invention according to aspect 1 provides a resource reservation management device for a resource sharing system that shares resources with a plurality of user terminals, the resource reservation management device including: a reservation setting unit configured to accept a reservation request for the resource from the user terminal, and set a reservation on a predetermined resource in the resource sharing system; and a reservation changing unit configured to reset the reservation to another resource in the resource sharing system in case the predetermined resource becomes unavailable, wherein for the reservation to be reset, if the other resource has insufficient resource capacity, the reservation changing unit resets the reservation to the other resource based on a reservation changing policy defining which reservation is preferentially reset out of the reservation to be reset.

The invention according to aspect 8 provides a method of managing resource reservation in a resource sharing system that shares resources with a plurality of user terminals, the method including: accepting a reservation request for the resource from the user terminal, and setting a reservation on a predetermined resource in the resource sharing system; and resetting the reservation to another resource in the resource sharing system in case the predetermined resource becomes unavailable, wherein in the resetting, if the other resource has insufficient resource capacity, the reservation changing unit resets the reservation to the other resource based on a reservation changing policy defining which reservation is preferentially reset out of the reservation to be reset.

In this way, when the predetermined resource becomes unavailable and the capacity of the other available resource is insufficient for the reservation to be reset, the reservation preferentially reset can be uniquely determined to improve the efficiency of the system.

According to the invention of aspect 2, in the resource reservation management device according to aspect 1, the reservation request includes information indicating priority of the reservation, and the reservation changing policy is defined that the reservation with a high priority is preferentially reset.

In this way, the user's intention can be reflected in the order of resetting of the reservations, improving the convenience of the user.

According to the invention of aspect 3, in the resource reservation management device according to aspect 1, the reservation request includes information indicating date and time for use of the resource, and the reservation changing policy is defined that the reservation for early start date and time for use is preferentially reset.

In this way, the reservation that is likely to start until the unavailable resource is recovered can be preferentially reset, thereby reducing the number of failed reservations.

According to the invention of aspect 4, in the resource reservation management device according to aspect 1, the reservation request includes information indicating a capacity of the resource to be used, and the reservation changing policy is defined that the reservation with a small capacity is preferentially reset.

In this way, more reservations can be may be set to the limited available resources, reducing the number of failed reservations.

According to the invention of aspect 5, in the resource reservation management device according to aspect 1, the reservation request includes information indicating a usage period of the resource, and the reservation changing policy is defined that the reservation of a short usage period of the resource is preferentially reset.

In this way, more reservations can be may be set to the limited available resources, reducing the number of failed reservations.

According to the invention of aspect 6, in the resource reservation management device according to aspect 1, the reservation request includes at least two pieces of information among the information indicating the date and time for use of the resource, the information indicating the capacity used in the resource, and the information indicating the usage period of the resource, and the reservation changing policy is defined that each of the at least two pieces of information is weighted for scoring, and the reservation to be preferentially reset is determined based on a magnitude of score.

In this way, a plurality of factors can be reflected in determining the reservation to be preferentially reset.

According to the invention of aspect 7, in the resource reservation management device according to aspect 1, the reservation changing policy is defined to reset the reservation using an algorithm that solves Bin Packing problem so as to maximize a number of available reservations.

In this way, the reservation that can be made in the overall resource sharing system can be maximized, thereby setting the reservations more efficiently.

Effects of the Invention

According to the present invention, when the resource reserved in the resource sharing system become unavailable, the reservation can be efficiently transferred.

DESCRIPTION OF EMBODIMENTS

Hereinafter, a preferred embodiment (hereinafter referred to as an embodiment) of a resource reservation management device 42 and a resource reservation management method according to the present invention will be described in detail with reference to the accompanying drawings.

Figure 1:
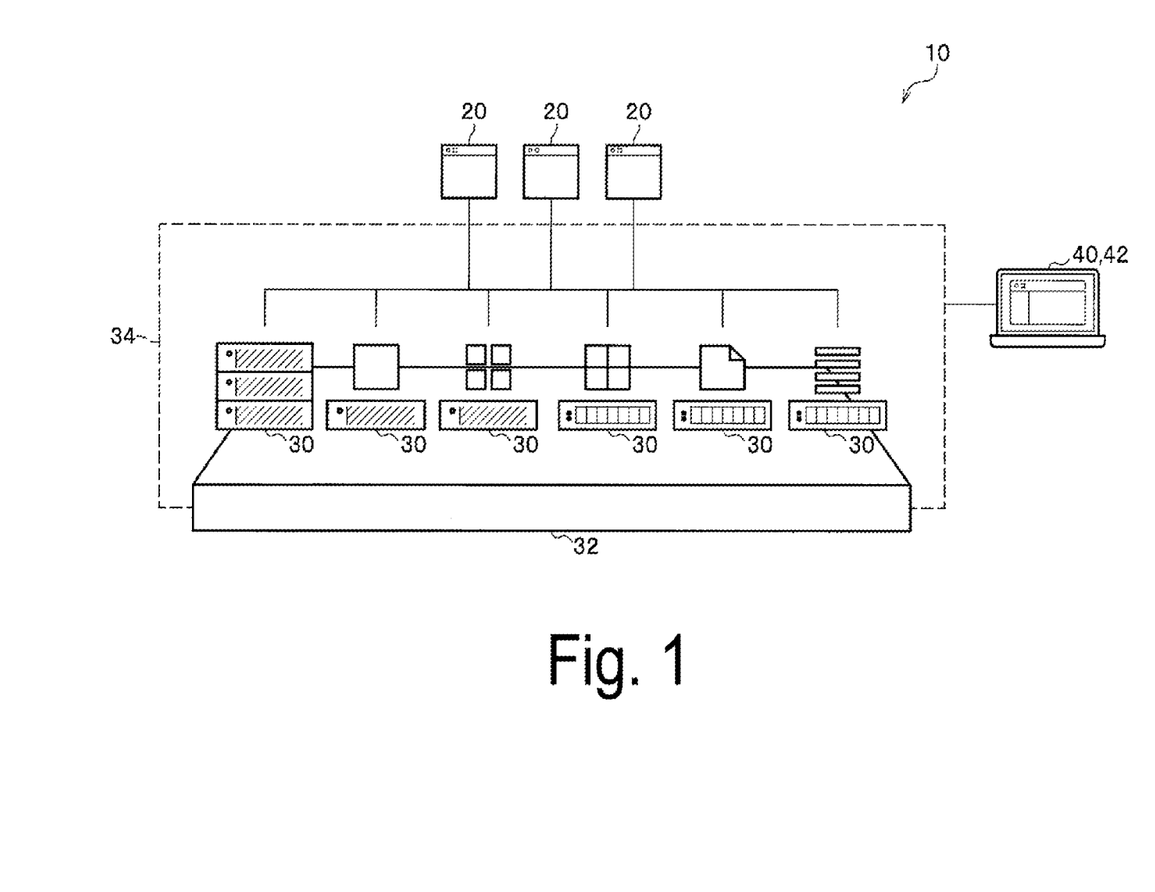
FIG. 1 illustrates an exemplary configuration of a resource sharing system according to the present embodiment.

FIG. 1 illustrates an exemplary configuration of a resource sharing system 10 according to the present embodiment.

The resource sharing system 10 is a system for sharing a plurality of resources 30 with a plurality of users 20.

Each of the users 20 is, for example, a user terminal (not illustrated) that stores an application for achieving resource sharing therein. The resources 30 are, for example, bare metal, virtual machine, container, and various storages. Each of the resources 30 is connected to a common network 32 and is managed by a cloud operating system 34 such as Open Stack.

The cloud operating system 34 is managed through a dashboard on the system management device 40, and is configured to enable an administrator to provide the resources 30 through a web interface. The system management device 40 also monitors the resource sharing system 10 and provides a tool.

Here, in the resource sharing system 10, the user 20 can reserve the resources 30 using a service such as Blazar. In the present embodiment, the system management device 40 functions as a resource reservation management device 42 that manages the reservation of the resources 30.

Figure 2:
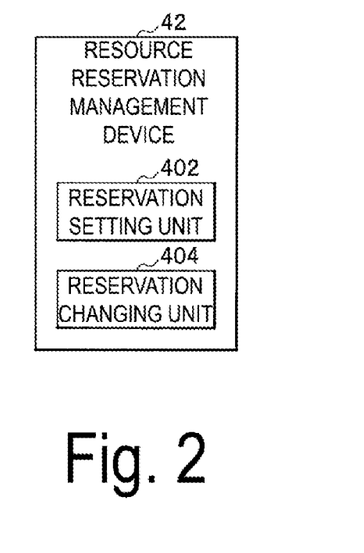
FIG. 2 is a block diagram illustrating a functional configuration of a resource reservation management device according to the present embodiment.

FIG. 2 is a block diagram illustrating a functional configuration of the resource reservation management device 42 according to the present embodiment.

The resource reservation management device 42 is embodied as a computer or the like provided with control means, storage means, and input/output means (all not illustrated). The control means includes a reservation setting unit 402 and a reservation changing unit 404.

Figure 3:
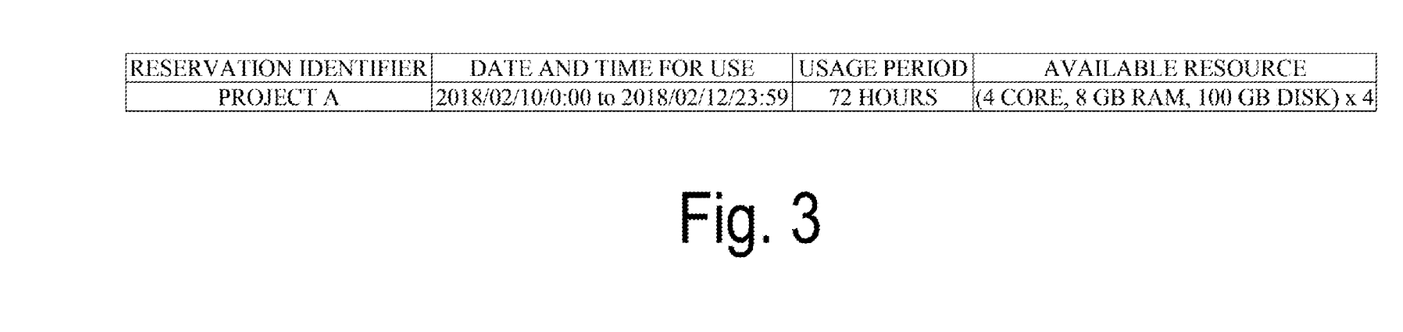
FIG. 3 is an explanatory diagram schematically illustrating an example of a resource reservation request.

The reservation setting unit 402 accepts a reservation request for the resource 30 from the user 20, and sets a reservation on the predetermined resource 30 in the resource sharing system 10. The request from the user 20 includes conditions for the resource 30 as illustrated in FIG. 3, and the reservation setting unit 402 sets the reservation to the predetermined resource 30 according to the conditions. Note that the reservation setting unit 402 stops accepting a new reservation request while a reservation changing unit 404 described later resets the reservation.

When the predetermined resource 30 (reserved resource 30) becomes unavailable, the reservation changing unit 404 resets the reservation on the other resources 30 in the resource sharing system 10. A case w % here the resource 30 is not available includes, for example, w % ben the resource 30 fails, or a failure occurs in a network between the resource 30 and the user 20. Hereinafter, the reservation that has been set on the unavailable resource 30 is referred to as "reservation to be changed".

FIG. 3 is an explanatory diagram schematically illustrating an example of a reservation request for the resource 30.

The reservation request from the user 20 includes, for example, a reservation identifier ("Project A" in the example in FIG. 3) that identifies the reservation, date and time ("2018/02/10/0:00 to 2018/02/12/23:59" in the example of FIG. 3) using the resource 30, a usage period of the resource 30 ("72 hours" in the example in FIG. 3), and the type and capacity of the resource 30 to be used ("4 devices of 4 Core, 8 GB Ram. and 100 GB disk in the example in FIG. 3").

When receiving the reservation request, the reservation setting unit 402 sets the reservation on the resource 30 in the resource sharing system 10 according to conditions for use. The reservation state for each resource 30 is managed in a reservation table as illustrated in FIG. 4, and a right to use the resource 30 is given to the user 20 according to the reservation table.

Figure 4:
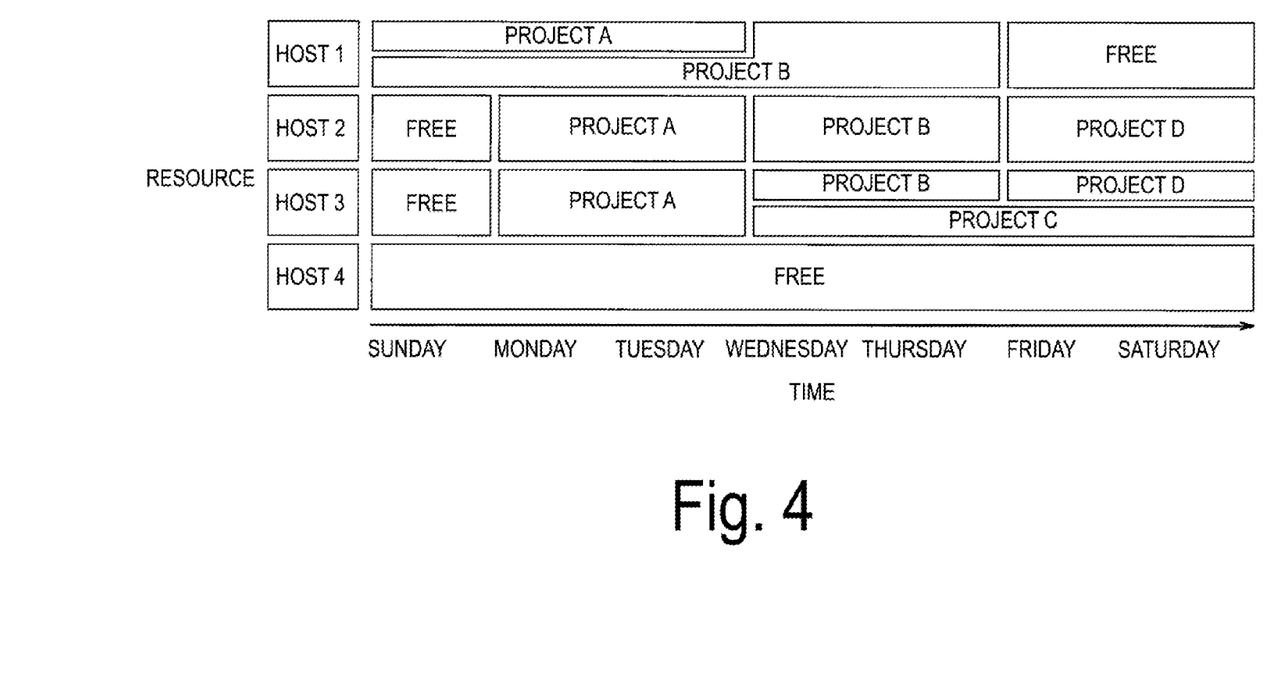
FIG. 4 is an explanatory diagram schematically illustrating a resource reservation table.

FIG. 4 is an explanatory diagram schematically illustrating the reservation table for the resources 30.

In FIG. 4, four host machines (hosts 1 to 4) are illustrated as the resources 30.

For example, the host 2 is free (available state), and is reserved by a project A on Monday and Tuesday, a project B on Wednesday and Thursday, and a project D on Friday and Saturday.

In addition, when the capacity of one resource 30 is sufficient, a plurality of users 20 may simultaneously reserve the one resource 30. For example, the host 1 is reserved by the project A and the project B from Sunday through Tuesday. That is, one resource 30 can be partially reserved.

Figure 5:
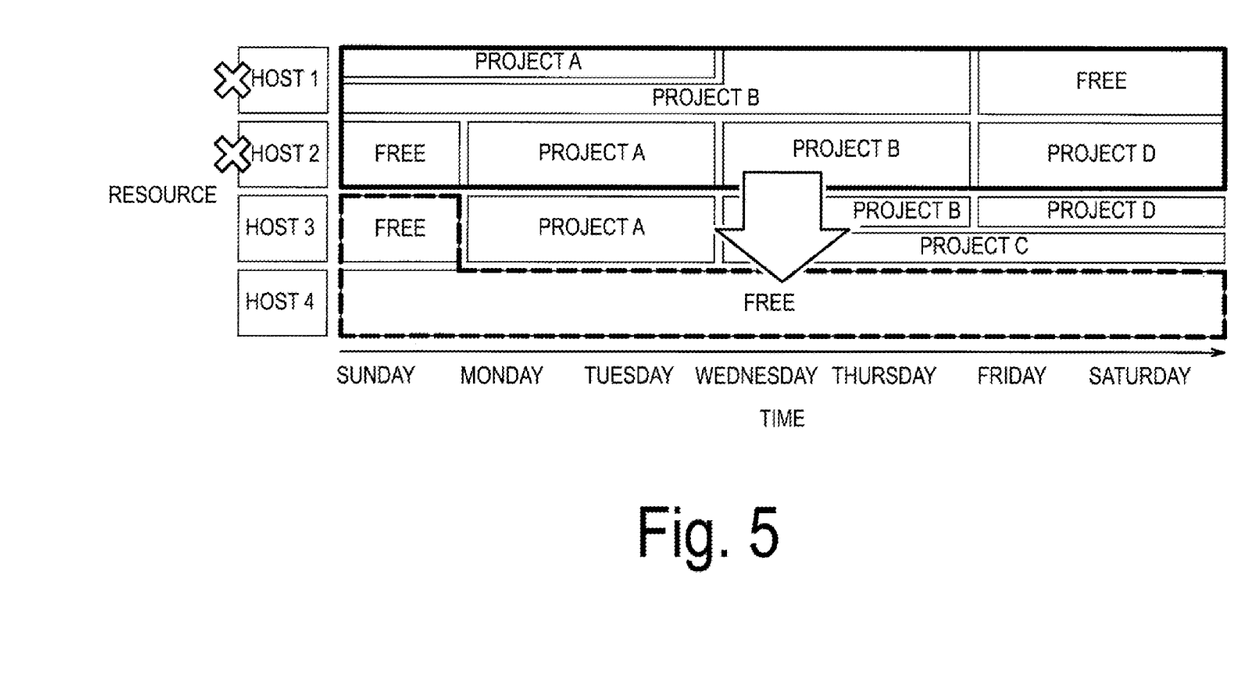
FIG. 5 is an explanatory diagram schematically illustrating the resource reservation table.

Here, when the host 1 and the host 2 fail and become unavailable in the reservation state illustrated in FIG. 4, the reservations set to the host 1 and the host 2, that is, the reservations surrounded with a thick solid line in FIG. 5 become the reservations to be changed. In this case, the reservation changing unit 404 basically resets (transfers) the reservations to other normal resources 30 (the host 3 and the host 4).

For example, in the illustrated example, in a region surrounded with a thick dotted line in FIG. 5, the host 4 is free (available) on all day of week, and the host 3 is free (available) on Sunday and thus, the reservation changing unit 404 transfers the reservations to be changed to these available resources 30. However, in the case where specifications of the hosts 1 to 4 are equivalent, from Monday onward, the capacity of the available resources 30 becomes a half of the capacity necessary for the reservations to be changed, such that all of the reservations to be changed cannot be transferred.

When the capacity of the normal resources 30 (other resources 30) is insufficient for the reservations to be reset, the reservation changing unit 404 resets the reservation to the other resources 30 based on a reservation changing policy set by an administrator of the resource sharing system 10.

The reservation changing policy is a policy that defines which reservation will be preferentially reset when all of the reservations to be reset cannot be reset to the other resources 30.

By resetting the reservation based on the reservation changing policy, limited resources 30 may be more efficiently utilized, thereby minimizing an impact on the user 20 due to that the reserved resource 30 becomes unavailable.

Reservation acceptance processing of the resource reservation management device 42 will be described before describing reservation changing processing of the reservation changing unit 404 in more detail.

Figure 6:
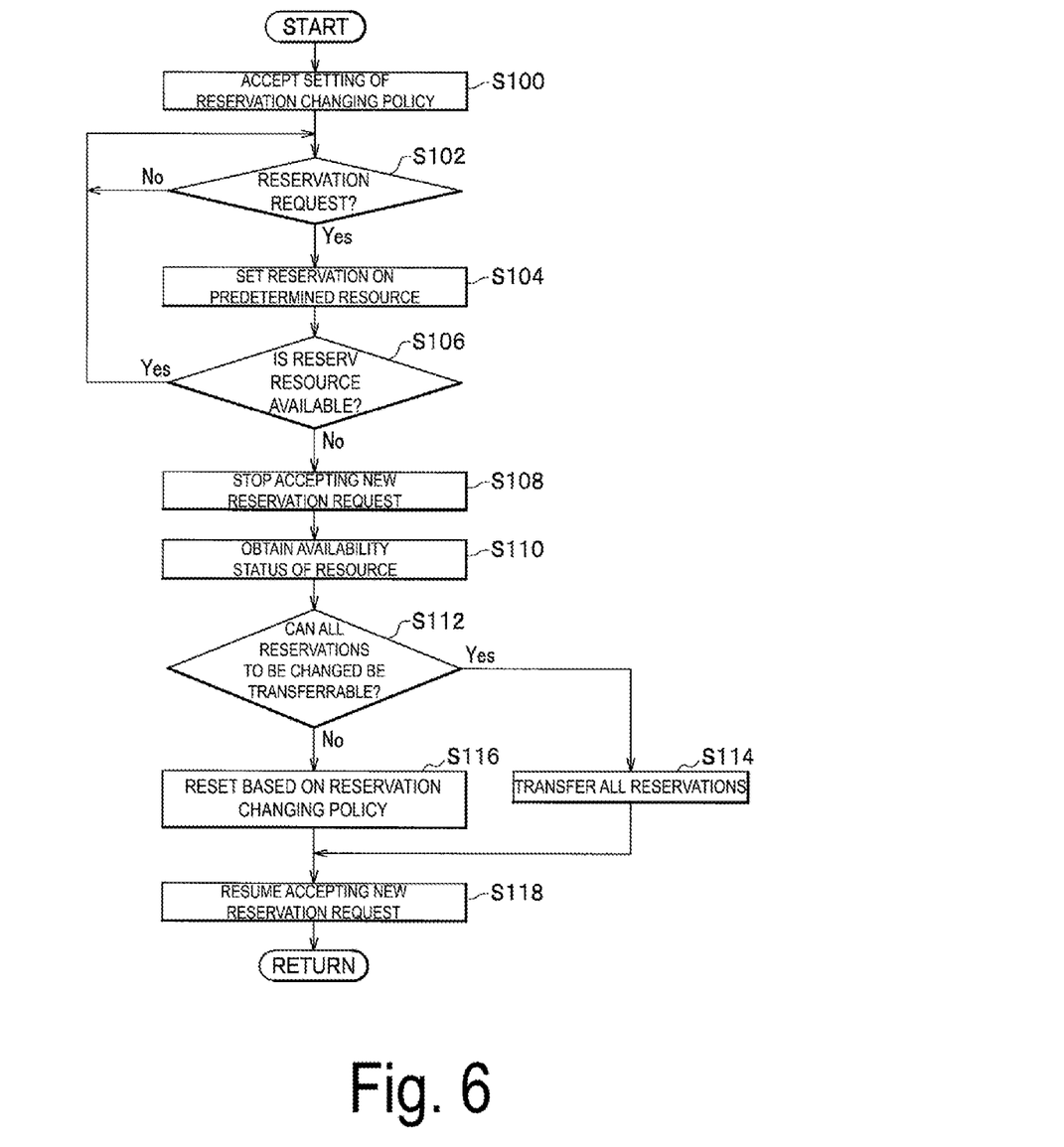
FIG. 6 is a flowchart illustrating a procedure of resource acceptance processing of the resource reservation management device.

FIG. 6 is a flow chart illustrating a procedure for the reservation acceptance processing of the resource reservation management device 42.

Prior to reservation, the reservation changing unit 404 of the resource reservation management device 42 accepts setting of the reservation changing policy from the administrator of the resource sharing system 10 (step S100). Note that the setting contents of the reservation changing policy can be changed at any timing.

Then, the reservation setting unit 402 of the resource reservation management device 42 determines whether or not a reservation request has been received from the user 20 (user terminal) (step S102). When the reservation request has been received (step S102: Yes), the reservation setting unit 402 sets the reservation to a predetermined resource (the resource 30 specified by the user 20) (step S104). On the contrary, when the reservation request has not been received (step S102: No), the reservation setting unit 402 waits for reception.

When the reserved resource 30 has no failure and is available (step S106: Yes), the reservation setting unit 402 returns to the step S102, and continues to accept the reservation. Note that although not illustrated in the drawings, when the date and time for use as set in the reservation is reached, the resource reservation management device 42 appropriately gives a right to use the resource 30 to the user 20 (execution of the reservation).

On the contrary, when the reserved resource 30 has a failure or the like and becomes unavailable (step S106: No), the reservation setting unit 402 stops accepting a new reservation request (step S108).

This is to prioritize the transfer of the reservation (reservation to be changed) for the unavailable resource 30 over the acceptance of a new reservation. This can prevent transfer of the initially-set reservation from failing due to the new reservation.

In addition, the reservation changing unit 404 obtains information on the availability state of available resources 30 (other resources 30) (step S110), and determines whether or not all of the reservations for the unavailable resource 30 (reservations to be changed) can be transferred to the other resources 30 (step S112).

When all of the reservations to be changed can be transferred to the other resources 30, for example, the capacity of the resources 30 is sufficient (step S112: Yes), the reservation changing unit 404 transfers all of the reservation to be changed to the other resources 30 (step S114).

On the contrary, when all of the reservations to be changed cannot be transferred, for example, the capacity of the resources 30 is insufficient (step S112: No), the reservation changing unit resets the reservations to the other resources 30 in order of priority based on the reservation changing policy set in the step S100 (step S116). As a result, a low priority reservation may fail.

When transfer or resetting of the reservations is completed, the reservation setting unit 402 resumes accepting a new reservation request (step S118), and returns to step S102 to repeat the subsequent processing. Note that, after resuming accepting a reservation, the reservation setting unit 402 allocates the reservation only to the available resources 30.

Next, details of the resetting of the reservation based on the reservation changing policy (step S116 in FIG. 6) will be described.

In this embodiment, the following six criteria are illustrated as reservation changing policies. In the step S100 of FIG. 6, the administrator of the resource sharing system 10 determines which of the following policies 1 to 6 is adopted, and the reservation changing unit 404 of the resource reservation management device 42 accepts and sets the determined policy.

Policy 1: User designation priority
Policy 2: Early priority
Policy 3: Small capacity priority
Policy 4: Short period priority
Policy 5: Mixed-type
Policy 6: Maximum available reservations Hereinafter, each policy will be described in detail.

Policy 1: User designation priority

In the policy 1, the user 20 specifies the priority of the reservation at request of reservation. Then, at resetting of reservation, reservations are reset in order of priority.

That is, the reservation request from the user 20 includes information indicating the priority of the reservation, and the reservation changing policy (policy 1) is defined that the reservation of higher priority is preferentially reset to the other resources 30.

In this way, the user's intention can be reflected in the order of resetting of the reservations, improving the convenience of the user.

Employing the policy 1 increases the likelihood that the reservation of low priority fails. Thus, in order to prevent the priority of each reservation being biased (for example, the highest priority is set to all reservation), for example, the resource reservation management device 42 may limit the priority of each project or user 20, or normalize the priority of a priority request from each user 20 in consideration of the overall priority request situation.

Figure 7:
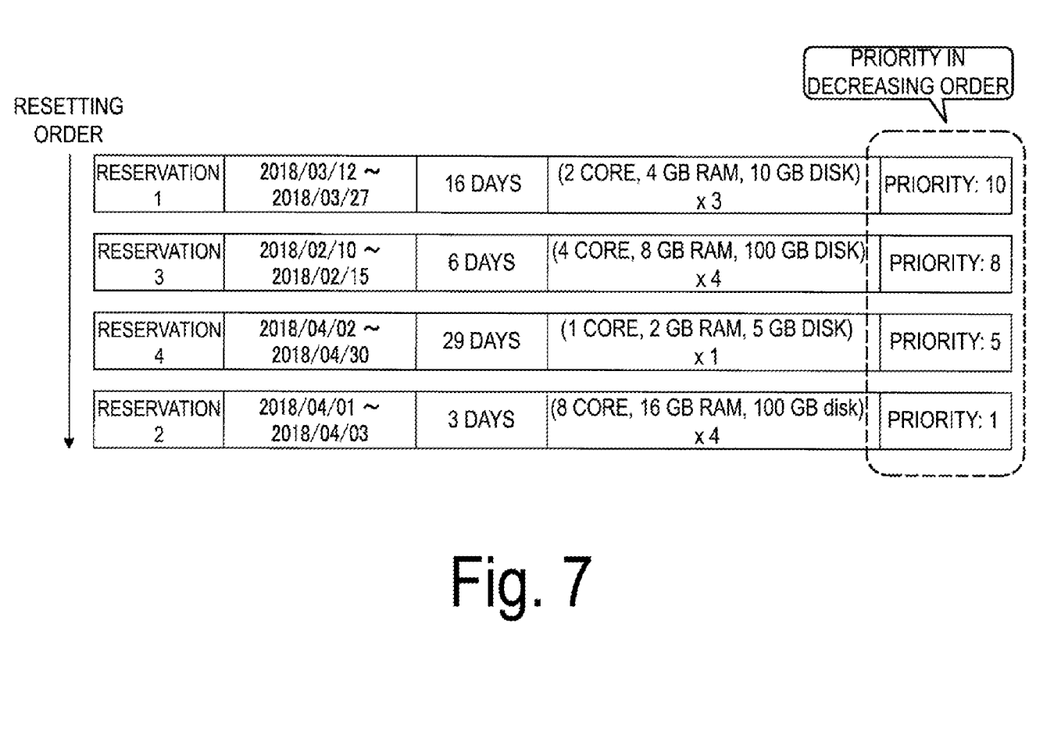
FIG. 7 is an explanatory view illustrating a reservation resetting order in the case of applying a policy 1.

FIG. 7 is an explanatory view illustrating a reservation resetting order in the case of applying the policy 1.

FIG. 7 illustrates the contents of four reservations (reserves 1 to 4), and indicates, from the left, reservation identifier, date and time for use, resource, and priority set by the user 20. In FIG. 7, the date and time for use and the usage period are indicated by the day.

In the example in FIG. 7, the priority is increased as the value of the priority is larger, and the reservation 1 having priority 10, the reservation 3 having priority 8, the reservation 4 having priority 5, and the reservation 2 having priority 1 are (preferentially) reset to other resources 30 in this order. Because reservation cannot be set to reserved resources 30, reservations of lower priority are more likely to fail.

Policy 2: Early priority

In the policy 2, reservations are reset in the order in which the starts (early reservation). That is, the reservation request from the user 20 includes information indicating the date and time for use of the resource 30, and the reservation changing policy (policy 2) is defined that the reservation of early start date and time for use of the resource 30 is preferentially reset.

Since the unavailable resources 30 will be recovered at some point, the reservation urgently affected is preferentially recovered. That is, the reservation that is likely to start until the unavailable resource 30 is recovered can be preferentially reset, thereby reducing the number of failed reservations.

Figure 8:
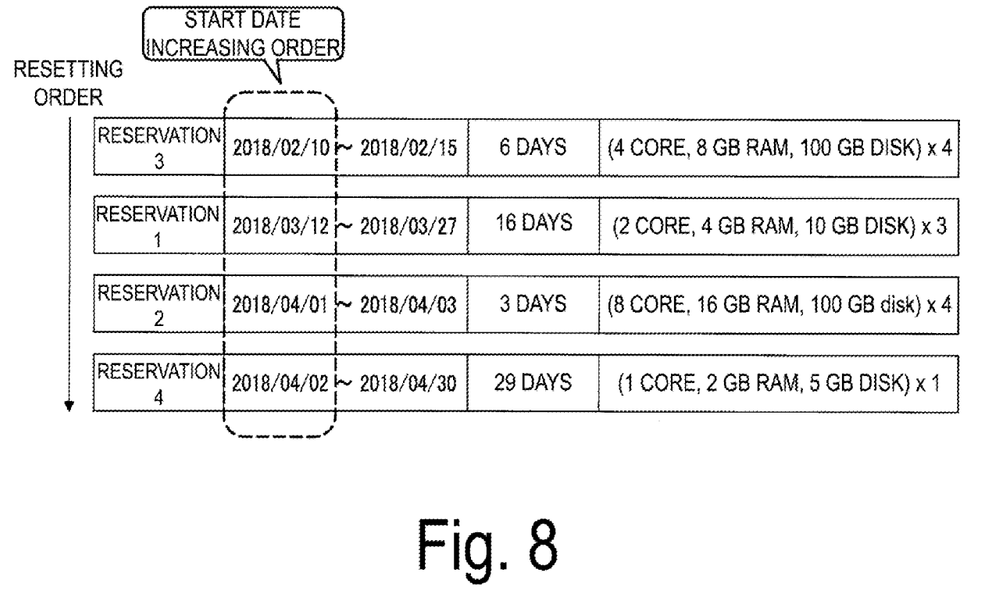
FIG. 8 is an explanatory view illustrating a reservation resetting order in the case of applying a policy 2.

FIG. 8 is an explanatory view illustrating a reservation resetting order in the case of applying the policy 2.

The contents of the four reservations (reservations 1 to 4) illustrated in FIG. 8 are similar to those in FIG. 7.

In the example of FIG. 8, the reservation 3 with the start date and time of 2018/02/10, the reservation 1 with the start date and time of 2018/03/12, the reservation 2 with the start date and time of 2018/04/01, and the reservation 4 with the start date and time of 2018/04/02 are (preferentially) reset to the other resource 30 in this order.

Although the reservation of late start date and time for use is likely to initially fail, when the resource 30 is recovered by the start date and time, the reservation can be reset.

Policy 3: Small capacity priority

In the policy 3, the reservations are reset in increasing order of capacity used in the resource. That is, the reservation request from the user 20 includes information indicating the capacity used in the resource 30, and the reservation changing policy (policy 3) is defined that the reservation of smaller capacity used in the resource is preferentially reset. This is to increase the number of resettable reservations, reducing the number of failed reservations.

Figure 9:
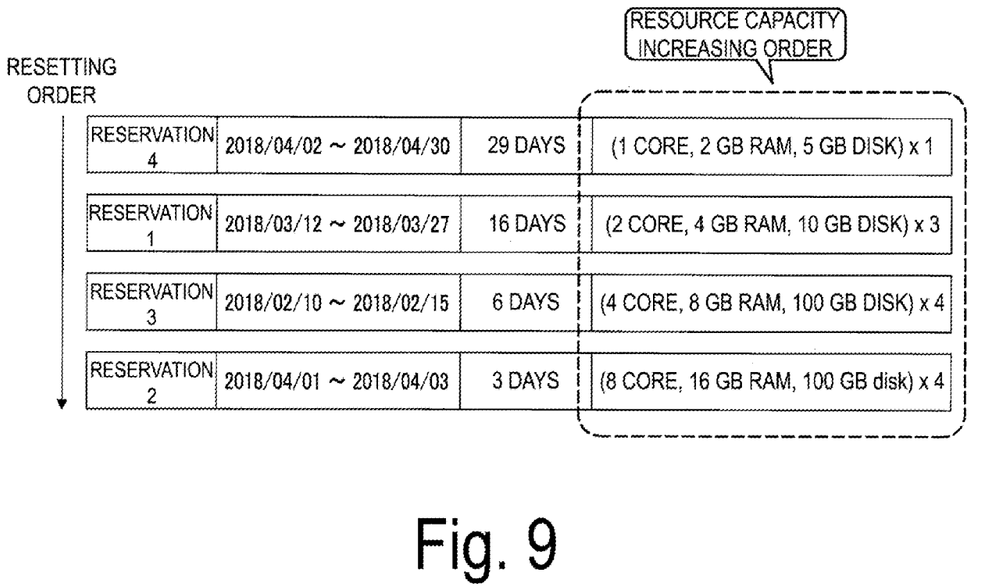
FIG. 9 is an explanatory view illustrating a reservation resetting order in the case of applying a policy 3.

FIG. 9 is an explanatory view illustrating a reservation resetting order in the case of applying the policy 3.

The contents of the four reservations (reservations 1 to 4) illustrated in FIG. 9 are similar to those in FIG. 7.

In the example in FIG. 9, the reservation 4 of a reserved resource capacity (1 core, 2 GB RAM, 5 GB disk)×1, the reservation 1 of a reserved resource capacity (2 cores, 4 GB RAM, 10 GB disk)×3, the reservation 3 of a reserved resource capacity (4 cores, 8 GB RAM, 100 GB disk)×4, and the reservation 2 of a reserved resource capacity (8 core, 16 GB RAM, 100 GB disk)×4 are (preferentially) reset to the other resources 30 in this order.

Even in the case where one reservation of a large capacity used in the resource consumes the entire resource 30, there is a high possibility that a plurality of reservations of a small capacity used in the resource can be allocated to the resource.

Policy 4: Short period priority

In the policy 4, the reservations are reset in increasing order of usage period.

That is, the reservation request from the user 20 includes information indicating the usage period of the resource 30, and the reservation changing policy (policy 4) is defined that the reservation of short usage period of the resource 30 is preferentially reset.

As in the policy 3, it is to increase the number of resettable reservations, reducing the number of failed reservations.

Figure 10:
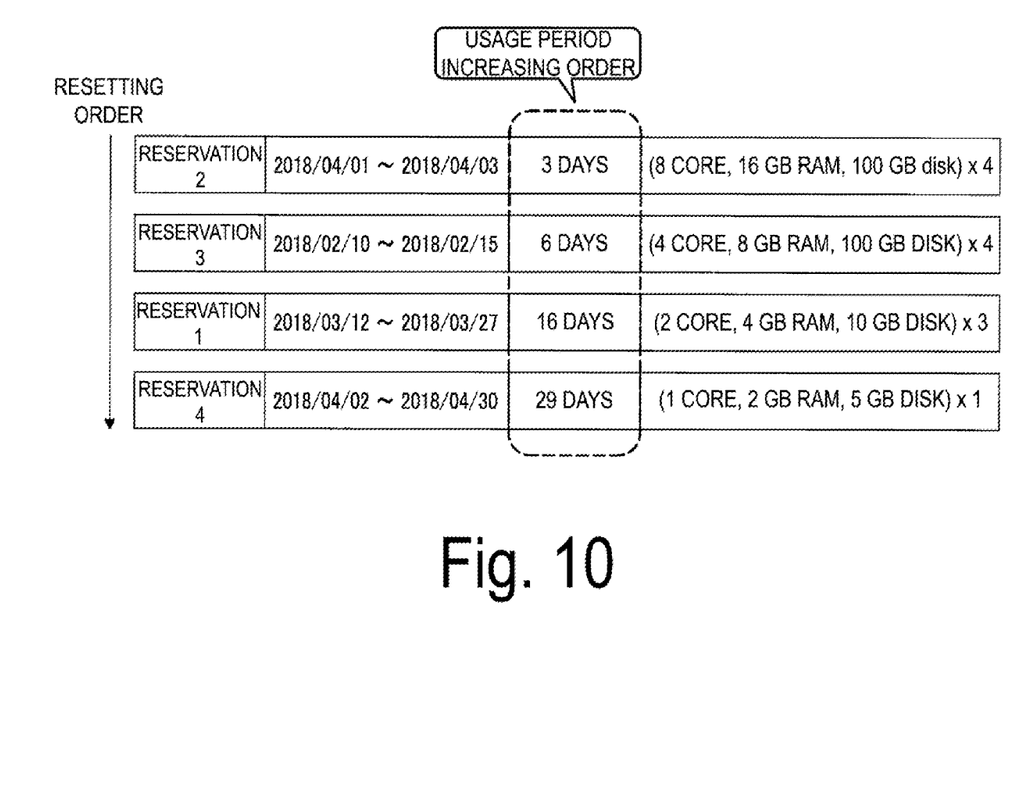
FIG. 10 is an explanatory diagram illustrating a reservation resetting order in the case of applying a policy 4.

FIG. 10 is an explanatory view illustrating a reservation resetting order in the case of applying the policy 4.

The contents of the four reservation (reservations 1 to 4) illustrated in FIG. 10 are similar to those in FIG. 7.

In the example in FIG. 10, the reservation 2 of the usage period of three days, the reservation 3 of the usage period of six days, the reservation 1 of the usage period of 16 days, and the reservation 4 of the usage period of 29 days are preferentially reset to the other resources 30 in this order. Even in the case where one reservation of a long usage period consumes the entire resource 30, there is a high possibility that a plurality of reservations of short usage period can be allocated to the resource.

Policy 5: Mixed-type

In the policy 5, a score S is calculated by weighting each of indexes of the policies 2 to 4, that is, start date and time (early priority), capacity used in resource (small capacity priority), and usage period (short period priority) and totalizing the weighted values, and the reservations are reset in decreasing order of the score S.

In this way, a plurality of factors can be reflected in determining the reservation to be preferentially reset. Note that the priority order set in the early priority (policy 2) is referred to as "early priority", the priority order set in the small capacity priority (policy 3) is referred to as "capacity priority", and the priority order set in the short-time priority (policy 4) is referred to as "period priority".

The score S is calculated, for example, as follows (equation 1).

$$\text{Score } S = \text{early priority} \times w1 + \text{capacity priority} \times w2 + \text{period priority} \times w3 \quad \text{(equation 1)}$$

($w1$, $w2$, $w3$: weight for each index)

Note that the score may be calculated using any two of the three indexes: the early priority, the capacity priority, and the period priority rather than using the three indexes. That is, the reservation request from the user 20 includes at least two pieces of information (indexes) among the information indicating the date and time for use of the resource 30, the information indicating the capacity used in the resource 30, and the information indicating the usage period of the resource 30, and the reservation changing policy (policy 5)

is defined that each of the at least two pieces of information is weighted for scoring, and the reservation to be (preferentially) reset is determined based on a magnitude of score.

Policy 6: Maximization of number of available reservations

In the policy 6, an overall optimization algorithm such as Bin packing (see Non Patent Literature 3) is used to reset the reservations in such an order to minimize the number of failed reservations.

That is, the reservation changing policy (policy 6) is defined that the algorithm that solves Bin Packing problem is used to reset reservations so as to maximize the number of available reservations.

In this way, the number of reservations that can be made in the overall resource sharing system 10 can be maximized, thereby setting the reservations more efficiently.

Note that in the present embodiment, the following two patterns are possible for the reservation to be reset.

Pattern 1

Reservation set on the unavailable resource 30 (reservation to be changed)

In the case of the pattern 1, only the reservation set on the unavailable resource 30 is reset (transferred) and therefore, the reservation set on the available resource 30 having no failure is not affected.

Pattern 2

All reservations set on the resources 30 (reservation to be changed+reservation set on the available resource 30)

In the case of pattern 2, all reservations are reservations to be reset, and the reservation set on available resource 30 may be affected (for example, fail).

For example, in the policy 1, the reservation with high priority defined at reservation request is preferentially reset. However, when the pattern 1 is adopted, a following event may occur: the reservation with low priority set on the resource 30 having no failure is made as initially planned, and the reservation with relatively high priority set on the resource 30 having a failure is not made.

In contrast, when the pattern 2 is adopted, because all reservations including the reservation originally set on the resource 30 having no failure are set in the order of priority, the reservation with high priority can be performed more reliably.

That is, the use of pattern 2 may optimize the reservation in the overall system.

On the other hand, because only the reservation to be changed is reset in the pattern 1, processing loads of the resource reservation management device 42 can be reduced to address possible failures of the resources 30 more quickly.

As described above, when the predetermined resource 30 becomes unavailable and the capacity of the other available resource 30 is insufficient for the reservation to be reset, the resource reservation management device 42 of the resource sharing system 10 according to the present embodiment can uniquely determine the reservation preferentially reset to improve the efficiency of the system.

REFERENCE SIGNS LIST

10 Resource sharing system
20 User (user terminal)
30 Resource
32 Common network
34 Cloud operating system
40 System management device
42 Resource reservation management device
402 Reservation setting unit
404 Reservation changing unit

The invention claimed is:

1. A resource reservation management device for a resource sharing system that shares resources with a plurality of user terminals, the resource reservation management device comprising:
   a reservation setting unit configured to accept a reservation request for the resource from a user terminal from among the plurality of user terminals, and set a reservation on a predetermined resource in the resource sharing system; and
   a reservation changing unit configured to reset the reservation to another resource in the resource sharing system based on the predetermined resource becoming unavailable,
   wherein the reservation changing unit is configured to reset, based on the other resource having insufficient capacity, the reservation to the other resource based on a reservation changing policy defining which reservation is preferentially reset out of the reservation to be reset.

2. The resource reservation management device according to claim 1,
   wherein the reservation request includes information indicating priority of the reservation, and
   wherein the reservation changing policy is defined that the reservation with a high priority is preferentially reset.

3. The resource reservation management device according to claim 1,
   wherein the reservation request includes information indicating date and time for use of the resource, and
   wherein the reservation changing policy is defined that the reservation for early start date and time for use is preferentially reset.

4. The resource reservation management device according to claim 1,
   wherein the reservation request includes information indicating a capacity of the resource to be used, and
   wherein the reservation changing policy is defined that the reservation with a small capacity is preferentially reset.

5. The resource reservation management device according to claim 1,
   wherein the reservation request includes information indicating a usage period of the resource, and
   wherein the reservation changing policy is defined that the reservation of a short usage period of the resource is preferentially reset.

6. The resource reservation management device according to claim 1,
   wherein the reservation request includes at least two pieces of information from among the information indicating the date and time for use of the resource, the information indicating the capacity of the resource to be used, or the information indicating the usage period of the resource, and
   wherein the reservation changing policy is defined that each of the at least two pieces of information is weighted for scoring, and the reservation to be preferentially reset is determined based on a magnitude of score.

7. The resource reservation management device according to claim 1, wherein the reservation changing policy is defined to reset the reservation using an algorithm that solves Bin Packing problem so as to maximize a number of available reservations.

8. A method of managing a resource reservation in a resource sharing system that shares resources with a plurality of user terminals, the method comprising:
- accepting a reservation request for a resource from a user terminal from among the plurality of user terminals, and setting a reservation on a predetermined resource in the resource sharing system; and
- resetting the reservation to another resource in the resource sharing system based on the predetermined resource becoming unavailable,
- wherein resetting the reservation further comprises resetting, based on the other resource having insufficient resource capacity, the reservation to the other resource based on a reservation changing policy defining which reservation is preferentially reset out of the reservation to be reset.

9. The method according to claim 8,
- wherein the reservation request includes information indicating priority of the reservation, and
- wherein the reservation changing policy is defined that the reservation with a high priority is preferentially reset.

10. The method according to claim 8,
- wherein the reservation request includes information indicating date and time for use of the resource, and
- wherein the reservation changing policy is defined that the reservation for early start date and time for use is preferentially reset.

11. The method according to claim 8,
- wherein the reservation request includes information indicating a capacity of the resource to be used, and
- wherein the reservation changing policy is defined that the reservation with a small capacity is preferentially reset.

12. The method according to claim 8,
- wherein the reservation request includes information indicating a usage period of the resource, and
- wherein the reservation changing policy is defined that the reservation of a short usage period of the resource is preferentially reset.

13. The method according to claim 8,
- wherein the reservation request includes at least two information from among the information indicating the date and time for use of the resource, the information indicating the capacity of the resource to be used, or the information indicating the usage period of the resource, and
- wherein the reservation changing policy is defined that each of the at least two information is weighted for scoring, and the reservation to be preferentially reset is determined based on a magnitude of score.

14. The method according to claim 8, wherein the reservation changing policy is defined to reset the reservation using an algorithm that solves Bin Packing problem so as to maximize a number of available reservations.

\* \* \* \* \*